Patented July 19, 1938

2,124,421

UNITED STATES PATENT OFFICE 2,124,421

CYANIDE PROCESS

Leonard Klein, Clarkdale, Ariz., assignor to Phelps Dodge Corporation, New York, N. Y., a corporation of New York No Drawing. Application May 7, 1935, Serial No. 20,194

18 Claims. (Cl. 75—107)

This invention relates to the recovery of metals by means of cyanide solutions and has for an object the provision of certain improvements in cyanide processes. A particular object of the invention is to provide an improved process for recovering precious metals such as gold and silver. A further object of the invention is to provide an improved process for recovering precious metals from precious metal-bearing material containing base metals such as copper. The invention further contemplates the provision of an improved process for regenerating cyanide solutions.

The invention contemplates the treatment of all metal-bearing materials such as ores, slimes, concentrates, tailings and other metallurgical products containing valuable metals in such forms as to be soluble in alkaline cyanide solutions, and throughout the remainder of the specification and in the claims the term "ores" is intended to include all such materials. The invention also contemplates the treatment of all cyanide solutions amenable to treatment, for the regeneration of alkaline cyanide solutions, regardless of their methods of production.

For purposes of illustration, the invention will be described in its application to the treatment of precious metal-bearing ores containing copper and cyanide solutions containing precious metals and copper.

According to cyanide processes as employed heretofore, ore containing precious metals such as gold and silver are subjected to the action of dilute aqueous solutions of sodium, potassium, calcium or other cyanides in leaching operations to dissolve the gold and silver, forming complex cyanides. The reactions involved may be represented by the following equations:

$$2Au+4KCN+O+H_2O=2KCN\cdot 2AuCN+2KOH$$
$$2Ag+4KCN+O+H_2O=2KCN\cdot 2AgCN+2KOH$$

The resulting solution, containing free sodium or potassium cyanide and one or more precious metal cyanides is subjected to the action of metallic zinc to precipitate the precious metals in elemental form, the zinc displacing gold and silver probably in accordance with the following equations:

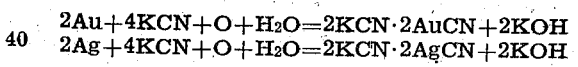
$$\qquad Au+2KCN\cdot Zn(CN)_2+H+KOH$$
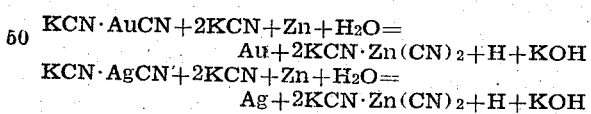
$$\qquad Ag+2KCN\cdot Zn(CN)_2+H+KOH$$

The precious metal precipitate is separated from the residual solution and melted and cast into suitable forms, and the filtrate is returned to the leaching cycle.

When a base metal cyanicide such as copper is present in the ore, considerable trouble results from fouling of the leaching solutions. Copper carbonate, for example, reacts with alkali metal cyanide in alkaline solution in accordance with the following equation:

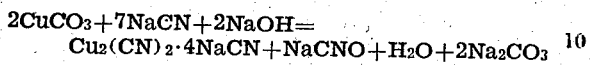

The above equation indicates a consumption of 2.7 pounds of NaCN per pound of copper, 2.3 pounds being complexed with the copper.

Alkaline cyanides are relatively high-priced chemicals and their consumption in a cyanidation operation constitutes one of the major operating costs. One of the chief causes of high consumption of cyanide is the formation of soluble double cyanides or complex cyanogen compounds of the base metals such as copper, as indicated by the above equation. The efficiency of a cyanide process in the treatment of precious metal-bearing ore containing base metal cyanicides such as copper is further reduced by virtue of the fact that leaching solutions highly charged with double cyanides or complex cyanogen compounds of such metals are inefficient solvents of gold and silver. Solutions containing copper may deposit metallic films on the zinc employed for precipitation which coat the zinc in such a way that the precipitation of gold and silver is retarded. When copper has accumulated to a certain extent in the solution, it also becomes practically impossible to use the solution for extraction of gold and silver from the ore, and the copper must be removed by some means or the solution must be wasted.

Many methods or processes have been proposed for overcoming the difficulties encountered in the treatment of precious metal-bearing ores containing base metal cyanicides. These processes, for the most part, have been designed to effect the recovery of the cyanogen in fouled solutions. Probably the most effective of such processes proposed heretofore is one involving acidification of the solution with the resulting production of hydrogen cyanide and the precipitation of insoluble cyanides. Briefly this process consists in acidifying the cyanide solution, thus converting part of the contained cyanogen to hydrogen cyanide, a gas, and the remainder, together with the metals present, to soluble and insoluble cyanogen compounds. The hydrogen cyanide is removed from the acid solution by blowing with air and is re-absorbed from the air in an alkaline solution suitable for reuse. The precipitates of the insoluble cyanogen compounds are collected and may be treated by special but undesirable or uneconomical methods to regenerate the cyanogen to alkaline cyanide and to recover the metals. This method of treatment of the cyanide solution may accomplish the recovery of substantially all of the cyanogen present as free alkali cyanide and zinc double cyanide. Part of that combined with copper is readily recovered; the regeneration of the remainder, together with that existing as sulpho and ferro cyanides, requires other methods.

For the treatment of copper-bearing cyanide solutions, the above-described method still leaves much to be desired. Acidification of such a solution results in the precipitation of cuprous cyanide in which cyanide is combined with copper in the ratio of .77 lbs. equivalent NaCN per pound of copper. Although this represents a marked reduction in cyanide complexed with copper when compared with the 2.3 lbs. held by the copper when in solution, the consumption of cyanide represented is still of major importance if the solution contains much copper. Further recovery of cyanide from the cuprous cyanide involves other methods none of which has, so far as is known, offered an economic answer to this phase of the cyanide recovery problem.

I have discovered that the recovery of the cyanogen content of a solution containing base metals in solution may be facilitated by increasing the hydrogen ion concentration of the solution while the solution is in contact with a metal capable of displacing the metals contained in the solution from their combinations. For example, a cyanide solution containing gold, silver, copper and base metals similar to copper such as cobalt and nickel may be subjected to the action of an agent such as sulphuric acid, which is capable of functioning to increase the hydrogen ion concentration of the solution, in the presence of a metal such as zinc with the following results: (1) conversion of substantially all the copper into the innocuous metallic form; (2) conversion of substantially all the cyanogen into a recoverable form; (3) the production of a clear solution with little or no suspended matter or precipitates, thus simplifying the handling of the solution; (4) elimination of the necessity of treating separately a precipitate of cyanogen complexed with copper and similar metals, in an effort to recover the cyanogen; (5) precipitation of the gold and silver with the copper and other metals on the metallic zinc with little or no cyanogen, forming a product more easily convertible into finished commercial metal.

I prefer to employ a strong acid such as sulphuric acid and to add the acid to the solution while the solution is in contact with a suitable metal, but any suitable method and any suitable agent or combination of agents may be employed for increasing the hydrogen ion concentration of a solution to be treated in carrying out the process of my invention. Adjustment of the acidity of a solution by increasing the hydrogen ion concentration may be carried out at any suitable rate of speed, and the adjustment may take place entirely while the solution is in contact with a suitable precipitating metal, or partial adjustment may be carried out prior to effecting contact of the solution with the metal. Thus, for example, adjustment of the hydrogen ion concentration of an alkaline solution (to increase the hydrogen ion concentration) may be commenced while the solution is in contact with the precipitating metal (such as zinc), or, adjustment of the hydrogen ion concentration of such a solution may be carried out to the point of partial or substantially complete neutrality prior to effecting contact of the solution with the precipitating metal, and a further increase in the hydrogen ion concentration may be effected after the partially or substantially completely neutralized solution and the precipitating metal have been brought into contact.

The degree of acidity or the hydrogen ion concentration established in the solution at the conclusion of any particular precipitating operation will be determined by the results sought to be accomplished. The precipitating operation may be carried out to effect either substantially complete or only partial precipitation of a base metal such as copper. My investigations indicate that satisfactory precipitation of copper can be effected by gradually increasing the hydrogen ion concentration of a solution, having an initial hydrogen ion concentration equivalent to a pH in excess of 7, to a hydrogen ion concentration equivalent to a pH of about 3. In treating a solution containing gold, silver and copper and having an initial pH of 9 by gradually adding sulphuric acid to adjust the hydrogen ion concentration while the solution was in contact with metallic zinc, I found that substantially all of the gold, silver and copper had been precipitated in metallic form when a hydrogen ion concentration corresponding to a pH of 2.7 had been established. The results of my investigations indicate that precipitation of a base metal from a solution in contact with a precipitating metal such as zinc becomes more rapid and effective as the acidity of the solution increases. A rapid increase in the rate of precipitation takes place as the hydrogen ion concentration increases to a value greater than that corresponding to a pH of 7. I have also noted that stripping of HCN from a solution subjected to the precipitating process of the invention proceeds most favorably when the solution has a pH of about 3.

Briefly, a process of the invention for treating a fouled cyanide solution containing gold and silver and base metals such as copper, nickel and cobalt in solution may comprise the addition of an acid such, for example, as sulphuric acid to the cyanogen-bearing solution for the purpose of increasing the hydrogen ion concentration, and the addition of a metal (or metals), such as zinc, in such fashion that the solution is eventually acidified and practically all of the precious metals, as well as practically all of the base metals such as copper, cobalt, nickel, are precipitated on the precipitating metal or metals. Agitation with or without aeration may be included in the foregoing procedure. If desired, the various metals may be precipitated fractionally, e. g., the gold and silver with some of the copper may be precipitated as a first fraction, and the remainder of the metals brought down as a second fraction. One precipitating metal may be used for one stage of precipitation, and the same or one or more other metals may be used for the other stages of precipitation. The precipitating metal or metals may be separated from the residual solution by filtration or other equivalent means. Recovery of the cyanogen content may be accomplished by any of the usual methods of regeneration, i. e., by aeration and absorption in an alkali solution or by fixing the cyanogen content of the solution with an appropriate alkali addition to the more or less acidified liquor.

In carrying out the precipitation operation, employing, for example, a metal such as zinc (either plain or treated with lead acetate), an acid such as sulphuric acid can be slowly titrated into the solution and the precipitate that is formed at the point of contact between the acid and the solution is dispersed by agitation with or without aeration before addition of more acid. Contemporaneously with this precipitation and resolution, there appears to be a slight solution of some of the zinc with the accompanying formation of nascent hydrogen. Also, a precipitate appears on the zinc. When further addition of acid no longer causes precipitation in the clear solution, the zinc and its accompanying precipitated metals may be removed from the solution by filtration or otherwise, and the solution transferred to a disperser. From this point on, the regeneration may follow the usual procedure of dispersion and absorption.

Although I have indicated above that the precipitating metal may be introduced into the solution before acidification, it preferably should not be removed before partial or complete acidification takes place, and furthermore, it may be introduced as a whole, in partial batches or continuously during or after acidification. An alternative procedure to that described above is to first add a part of the acid or other agent for increasing the hydrogen ion concentration to partially or completely neutralize the solution, then add the zinc or other metal and finally the balance of the acid. Or, the solution may be completely acidified before the precipitating metal is added, but this has proven wasteful of zinc and acid, and also time consuming in comparison to the preferred method described above. For purposes of economy or for fractional precipitation of a series of metals from the pregnant solution, the precipitating metal may be added in steps.

If the original cyanide solution contains sulphocyanides it may be advisable to add an oxidizing agent such as manganese dioxide to catalyze the removal of cyanogen in the regeneration step.

According to a preferred complete process of the invention for treating an ore containing gold, silver and copper, the ore in a suitably finely divided form is leached in the customary manner with an alkaline cyanide solution of usual or customary composition. The pregnant solution may be separated from the tailings by filtration or in any other suitable manner.

The separated pregnant solution is transferred to a gas tight tank (called the acidifier), equipped for agitation by mechanical or other means. Zinc, as dust or shavings, is then added in slight excess over that required to precipitate completely the gold, silver and copper. Agitation is now started, and acid, preferably sulphuric acid is titrated in until all the gold, silver and copper are precipitated. The entire precipitating operation requires but a comparatively short period of time. The precipitate, consisting of gold, silver, copper and the small excess of zinc, is filtered off, washed and treated by any of the usual refining methods. The filtrate or barren solution is neutralized with lime to fix the cyanogen combined as HCN and returned to the ore leaching circuit.

In the event that all or part of the barren solution can not be returned to the leaching circuit, due to the building up of filter wash water or for other reasons, then all or part of the solution can be transferred to the regeneration plant where the solution is treated by the customary procedure for recovering the cyanogen combined as HCN. For example, the solution may be delivered to the top of a tower equipped with perforated discs and called the disperser. The solution descends through the disperser and, in the course of its journey, it meets an ascending current of air. The HCN is stripped from the acid solution and passes with the air stream into the bottom of a similarly equipped tower called the absorber. Here the ascending air and gas stream contacts a descending suspension of lime in water, and the HCN gas is absorbed by the lime and may be returned to the ore leaching circuit. The operations may be conducted in closed or open air circuit using one or several units in series with nearly complete recovery of the HCN.

Instead of precipitating the gold, silver and copper in a single operation, a fractional method of separation and precipitation may be employed. In carrying out a fractional method of separation and precipitation, the alkaline pregnant solution carrying gold, silver and copper may be passed through zinc boxes or agitated with zinc dust as in ordinary cyanide practice, whereby the gold and silver and a small portion of the copper are precipitated, and the precipitate is subsequently converted to doré bullion. The barren solution containing the bulk of the copper is transferred to the acidifier, a small excess of zinc (as dust or shavings), over that required to precipitate all of the copper, added, agitation started and acid, preferably sulphuric acid, is titrated in until all the copper has been precipitated. The precipitate, consisting of copper and the excess zinc is filtered off and converted to copper bullion by ordinary methods. The filtrate or barren solution thus obtained may be treated in the same manner as that obtained when precipitation is carried out in a single stage or step.

While zinc has been indicated as the preferred metal for precipitation, it is to be understood that the invention contemplates the use of other methals such as iron, aluminum, lead and magnesium and various combinations of two or more metals. In fractional precipitation operations, the same metal or combination of metals may be employed in all stages, or different metals or combinations of metals may be employed in different stages.

When acid is titrated into the pregnant solution in the acidifier in the presence of zinc, there is a momentary precipitation of gold, silver and copper cyanides, which almost instantly redissolve as the acid is neutralized by the alkali. When the solution reaches the acid stage there is a tendency for a precipitate to form, but the reaction with the zinc in acid solution has been so rapid that the gold, silver and copper are converted to the metals so that no appreciable quantity of precipitated cyanides accumulate. Nickel, cobalt, selenium, tellurium and other metals may also be precipitated by the zinc.

According to the preferred method of the invention, all the zinc or other metal is added at the same time and the acid is then titrated in, but this procedure may be varied and part of the acid may be added before the metal is added or both the acid and metal may be added in steps.

When ores containing appreciable quantities of sulphides are leached with alkaline cyanide solutions some of the cyanogen may be combined as thiocyanide, in which event, the cyanogen so combined is only partially converted to HCN in the regeneration system as described above. In order to recover all this cyanogen, it is necessary to use oxidizing agents such as manganese dioxide or similar compounds in the disperser. Although oxygen is available in air to the amount of about 21%, its action on the sulphur atom of CNS is slow and therefore an increase in rate of oxidation may be necessary. According to the method of my invention for treating a solution containing cyanogen combined as thiocyanide, an oxidizing agent such as a mixture of higher oxides of manganese ($Mn_2O_3$ and $MnO_2$), more or less hydrated, is added to the solution. The solution containing the manganese oxides is acidified in the presence of a metal such as zinc to effect the precipitation of the metals combined with cyanogen and to effect recovery of HCN. The barren solution may be neutralized with an alkaline agent to precipitate the manganese, and the manganese bearing precipitate may be further treated to regenerate the manganese oxides for further use.

I claim:

1. In a process for precipitating a metal from a cyanide solution in which the solution and a precipitating metal capable of displacing the metal to be precipitated from its combinations are brought into contact, the improvement which comprises gradually increasing the hydrogen ion concentration of the solution during the course of the precipitating operation to a value corresponding to a pH of about 3.

2. In a process for precipitating a metal from a cyanide solution having an initial hydrogen ion concentration equivalent to a pH in excess of 7, in which the solution and a precipitating metal capable of displacing the metal to be precipitated from its combinations are brought into contact, the improvement which comprises incorporating an acid in the solution during the course of the precipitating operation and thereby increasing the hydrogen ion concentration of the solution to a final value equivalent to a pH of about 3.

3. In a process for precipitating a metal from a cyanide solution in which the solution and a precipitating metal capable of displacing the metal to be precipitated from its combinations are brought into contact, the improvement which comprises incorporating in the solution during the course of the precipitating operation one or more substances capable of increasing its hydrogen ion concentration, and agitating the solution while the solution and the precipitating metal are in contact.

4. In a process for precipitating a metal from a cyanide solution in which the solution and a precipitating metal capable of displacing the metal to be precipitated from its combinations are brought into contact, the improvement which comprises adding to the solution, while the solution and the precipitating metal are in contact, one or more agents capable of increasing the hydrogen ion concentration of the solution, and aerating the solution during the course of the precipitating operation.

5. In a process for precipitating a metal from a cyanide solution in which the solution and a precipitating metal capable of displacing the metal to be precipitated from its combinations are brought into contact, the improvement which comprises increasing the hydrogen ion concentration of the solution to a value materially higher than that equivalent to a pH of 7 during the course of the precipitating operation.

6. A process for recovering copper from ore which comprises subjecting the ore to the action of a cyanide solution to form a solution containing copper, and subjecting the solution containing copper simultaneously to the action of an acid and a metal capable of displacing copper, thereby to precipitate the copper in elemental form.

7. A process for recovering copper from ore which comprises subjecting the ore to the action of a cyanide solution to form a solution containing copper, and subjecting the solution containing copper simultaneously to the action of sulphuric acid and metallic zinc, thereby to precipitate the copper in elemental form.

8. A process for treating an ore containing a precious metal and copper which comprises subjecting the ore to the action of a cyanide solution to form a solution containing the precious metal and copper, and subjecting the solution containing the precious metal and copper simultaneously to the action of an acid and a metal capable of displacing the precious metal and copper, thereby to precipitate the precious metal and copper in elemental form.

9. A process for treating an ore containing gold, silver and copper which comprises subjecting the ore to the action of a cyanide solution to form a solution containing gold, silver and copper, and subjecting the solution containing gold, silver and copper simultaneously to the action of sulphuric acid and metallic zinc, thereby to precipitate the gold, silver and copper in elemental form.

10. A process for treating an ore containing a precious metal and a base metal which comprises subjecting the ore to the action of a cyanide solution to form a solution containing the precious metal and the base metal, subjecting the solution containing the precious metal and the base metal simultaneously to the action of an acid and a metal capable of displacing the precious metal, thereby to precipitate the precious metal in elemental form, separating the precipitated precious metal from the residual solution, and subjecting the residual solution to the action of an acid and a metal capable of displacing the base metal, thereby to precipitate the base metal in elemental form.

11. A process for treating an ore containing a precious metal and copper which comprises subjecting the ore to the action of a cyanide solution to form a solution containing the precious metal and copper, subjecting the solution containing the precious metal and copper simultaneously to the action of an acid and a metal capable of displacing the precious metal, thereby to precipitate the precious metal in elemental form, separating the precipitated precious metal from the residual solution, and subjecting the residual solution to the action of an acid and a metal capable of displacing the copper, thereby to precipitate the copper in elemental form.

12. A process for treating a cyanide solution containing a base metal which comprises bringing the solution and a metal capable of displacing the base metal from its combinations into contact to precipitate the base metal and to form hydrocyanic acid, increasing the hydrogen ion concentration of the solution during the course of the precipitating operation, and utilizing the hydrocyanic acid formed to produce an alkaline cyanide solution.

13. A process for treating a cyanide solution containing a precious metal and a base metal which comprises subjecting the solution simultaneously to the action of an acid and a metal capable of displacing the precious metal and the base metal, thereby to precipitate the precious metal and the base metal in elemental form and to form a solution of hydrocyanic acid, passing a current of gas through the solution to liberate the hydrocyanic acid, and absorbing the liberated hydrocyanic acid in an alkaline solution.

14. A process for treating a cyanide solution containing a precious metal and a base metal which comprises subjecting the solution simultaneously to the action of an acid and a metal capable of displacing the precious metal and the base metal, thereby to precipitate the precious metal and the base metal in elemental form and to form a solution of hydrocyanic acid, and adding an alkaline agent to the resulting solution.

15. A process for treating a cyanide solution containing a precious metal and a base metal which comprises subjecting the solution simultaneously to the action of sulphuric acid and a metal capable of displacing the precious metal and the base metal, and adding lime to the solution.

16. In a cyanide process for the recovery of gold and like precious metals, where the alkaline pregnant solution contains substantial amounts of copper dissolved from the ore being treated, the steps of effecting precipitation of gold from the alkaline solution, adding an acidifying agent to at least a part of the barren solution to acidify the same and contacting the solution with zinc dust during the course of the addition of the acidifying agent for effecting controlled precipitation of metallic copper therefrom, adding lime to the solution after the precipitated metallic copper has been removed, and then reusing the solution for contact with precious metal bearing ore.

17. In a process for precipitating a metal from a cyanide solution containing the metal in the form of a cyanide combination thereof and containing some cyanogen combined as thiocyanide, in which a metallic precipitating agent capable of precipitating the metal in solution from its cyanide combinations is added to the solution, the method of securing effective precipitation of the metal in solution and conversion of the thiocyanide combination to a form from which the cyanide component thereof may be recovered for re-use in the process, which comprises incorporating an oxidizing agent in the solution and increasing the hydrogen ion concentration of the solution during the course of the precipitating operation.

18. In a process for precipitating a metal from a cyanide solution containing the metal in the form of a cyanide combination thereof and containing some cyanogen combined as thiocyanide, in which a metallic precipitating agent capable of precipitating the metal in solution from its cyanide combinations is added to the solution, the method of securing effective precipitation of the metal in solution and conversion of the thiocyanide combination to a form from which the cyanide component thereof may be recovered for re-use in the process, which comprises incorporating an oxide of manganese in the solution and increasing the hydrogen ion concentration of the solution while the precipitating metal and the oxide of manganese are in contact therewith.

LEONARD KLEIN.